UNITED STATES PATENT OFFICE.

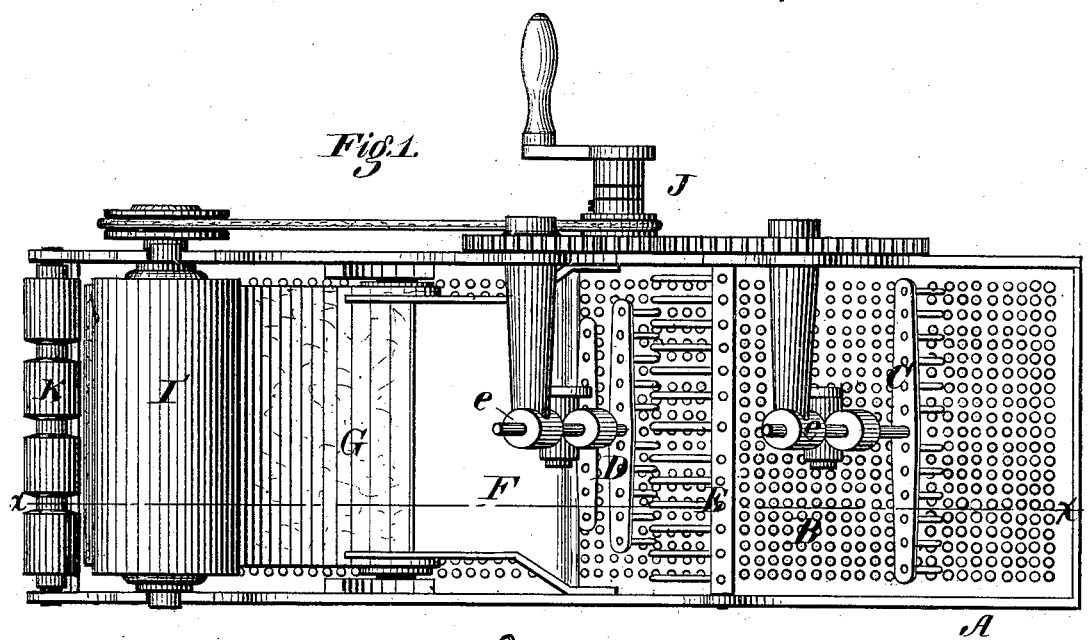
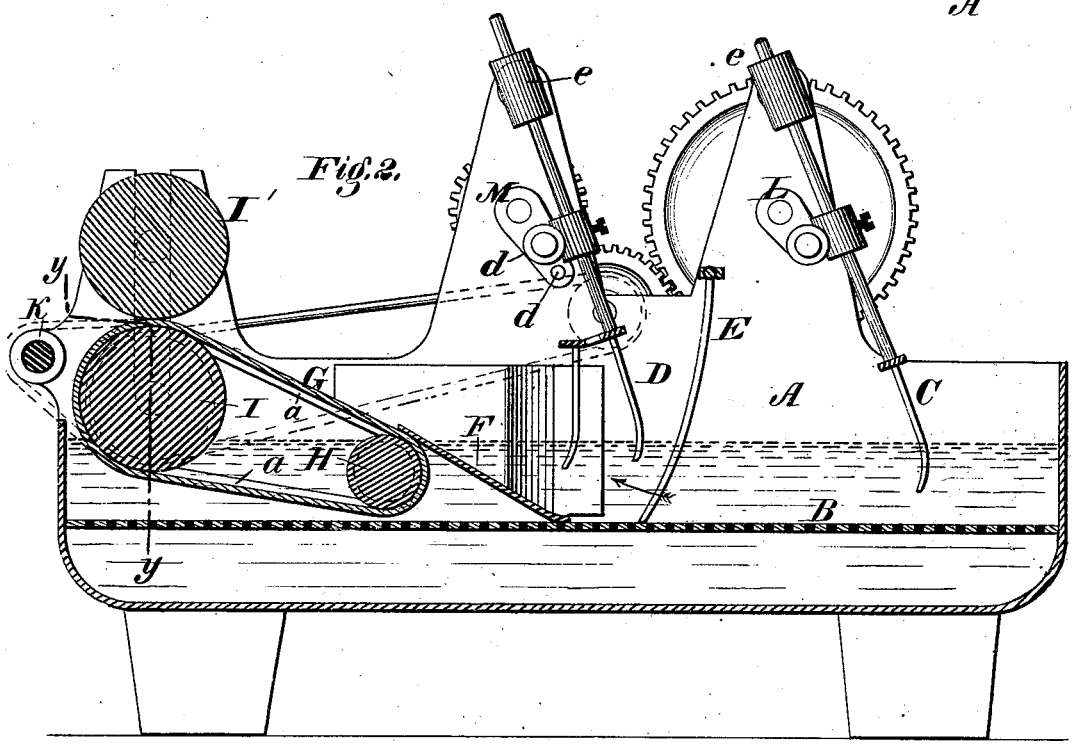
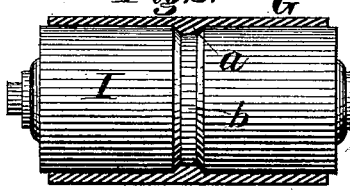

FREDERICK G. SARGENT, OF GRANITEVILLE, MASSACHUSETTS.

IMPROVEMENT IN WOOL-WASHING MACHINES.

Specification forming part of Letters Patent No. 206,489, dated July 30, 1878; application filed January 22, 1878.

*To all whom it may concern:*

Be it known that I, FREDERICK G. SARGENT, of Graniteville, in the county of Middlesex and State of Massachusetts, have invented certain Improvements in Wool-Washing Machines, of which the following is a specification:

My invention relates to that well-known class of machines in which the fiber is carried through the fluid in a tank or bowl by means of carrier-rakes, and delivered thereby to elevating-carriers, which pass the fiber between squeezing-rolls, which discharge it from the machine.

My improvements consist in arranging the carrier-rakes so that each one moves at a greater speed than the one next behind it, in order to comb, straighten, and evenly distribute the fiber in the wool; in the use of a rubber apron or belt, arranged to serve the double purpose of an elevator or carrier to convey the fiber from the rake to the rolls, and of applying a yielding pressure to the fiber as it passes between the rolls.

Figure 1 represents a top-plan view of my improved machine; Fig. 2, a longitudinal vertical section of the same on the line $x\,x$; Fig. 3, a transverse vertical setion on the line $y\,y$.

In the drawings, A represents the bowl or tank, forming the body or frame of the machine; and B, the usual perforated false-bottom, secured therein. C represents a swinging rake or carrier, arranged at the front end of the bowl, to receive the fiber and pass it forward, and which is known in the art as the "forwarding-rake." D represents a second rake or carrier, similar in construction to the first, arranged in advance of the same, to take the fiber therefrom and pass it forward to the delivering mechanism, and hence known in the art as the "carrier or delivery rake."

The rakes C D are of ordinary construction, consisting each of a sliding rod, mounted at its middle on a rotating crank, and arranged to slide at the upper end through a pivoted block, $e$, while at the lower end a series of teeth or tines are attached. The rotation of the crank causes the rake to be elevated and moved backward, and swung thence downward and forward through the bowl to advance the fiber.

In machines of the ordinary construction the two rakes C D are arranged to travel at the same rate of speed, so that the fiber passed forward at each movement of the former is taken up bodily by the latter and carried forward.

In the present machine I so arrange the parts that the rake D receives a greater speed than the rake C, for the purpose of drawing or combing out the fiber and delivering it in a sheet or layer to the elevating devices.

E represents a transverse gravitating gate, hinged or pivoted at its upper end between the two rakes C D, immediately behind the latter, and in close proximity to the delivering mechanism, which will be hereinafter described. The gate consists of a series of vertical fingers or teeth, between which the teeth of the rake D pass as the latter descends.

F represents an inclined plate, secured in advance of the gate E, to assist in delivering the fiber upon the delivery-belt or conveyer. G represents the conveyer belt or apron, consisting of an endless rubber sheet, having one end supported upon a roller, H, immediately under the upper edge of the plate F, and the other end supported upon a press-roller, I, in the rear end of the belt. I' represents a second press-roller, mounted above the roller I and bearing upon the apron G, the bearing of the roller I' being arranged to admit of the free vertical movement of the same.

The apron G is provided, as shown in Figs. 2 and 3, with an inside longitudinal rib, $a$, arranged to run in a corresponding groove in the supporting-roller. This rib serves to guide the apron accurately and prevent it from shifting sidewise without in the least interfering with the lateral expansion of the belt due to the pressure of the top roller.

While it is preferred to form the rib $a$ directly upon the belt at its center, it may be placed at either edge, or two or more ribs employed, if desired; and instead of forming the rib upon the belt, it may be attached thereto in any suitable manner.

The machine being set in motion, the bowl properly filled with the proper fluid, and the fiber delivered into the front end of the bowl, the operation is as follows: The rake C, acting upon the fiber, passes the same downward through the fluid and forward against the gate E, under which it is drawn by the action of the rake D, which latter in turn passes the fiber up the plate F and onto the apron G, by which it is conveyed between the rollers I I', which serve to remove surplus moisture and discharge the fiber at the rear end of the machine. By arranging the rake D to move at a greater speed than the rake C, it is caused to disentangle and open the fiber, and to spread the same into an extended sheet, and deliver it to the conveying devices in that form instead of in the usual compact mass.

The rubber apron G, arranged in the particular manner shown, serves the double purpose of a carrier to pass the fiber from the bowl to the press-rollers, and that of a yielding surface to support the fiber during its passage between the rollers, which latter may consequently be made of metal without the usual covering or surfacing of elastic material.

It is obvious that instead of the conveying mechanism F G, any other ordinary or suitable mechanism may be arranged in connection with the rake D and guide E to deliver the fiber to the press-rollers.

The gravitating gate, arranged as shown, and the belt with the rib thereon, form no part of the present invention, it being my design to make them the subjects of separate patents.

Disclaiming broadly the use of two carrier-rakes, the use of gravitating gates, and the use of rubber aprons in connection with press-rollers, What I do claim is—

1. In a wool-washing machine, the combination, substantially as shown and described, of two or more swinging carrier-rakes, delivering the fiber one to another, each arranged to move at a speed greater than that of the one from which it receives the fiber, for the purpose described.

2. In combination with the rake C, the rake D, arranged to move at a greater rate of speed than the first.

3. In a wool-washing machine, the combination of a swinging delivery-rake, two press-rolls, and an endless rubber apron, extending from a point beneath the rake to and around one of the rolls, as described and shown, whereby the fiber is delivered automatically to the rolls, and the apron caused to serve the double purpose of a conveyer and a yielding surface to press the fiber.

FREDERICK G. SARGENT.

Witnesses:
CHAS. G. SARGENT,
M. H. A. EVANS.